(12) United States Patent
Alley

(10) Patent No.: US 8,943,250 B2
(45) Date of Patent: Jan. 27, 2015

(54) SYSTEMS AND METHODS FOR CONCATENATING MULTIPLE DEVICES

(75) Inventor: Daniel Milton Alley, Earlysville, VA (US)

(73) Assignee: General Electric, Schenectady, NY (US)

(*) Notice: Subject to any disclaimer, the term of this patent is extended or adjusted under 35 U.S.C. 154(b) by 225 days.

(21) Appl. No.: 13/589,839

(22) Filed: Aug. 20, 2012

(65) Prior Publication Data

US 2014/0052881 A1 Feb. 20, 2014

(51) Int. Cl.
*G06F 13/00* (2006.01)

(52) U.S. Cl.
USPC .......................................... 710/110; 710/104

(58) Field of Classification Search
USPC ................................................. 710/110, 104
See application file for complete search history.

(56) References Cited

U.S. PATENT DOCUMENTS

| | | | |
|---|---|---|---|
| 5,928,345 A * | 7/1999 | Tetzlaff et al. | 710/107 |
| 8,195,857 B2 * | 6/2012 | Barrenscheen | 710/110 |
| 8,384,427 B1 * | 2/2013 | Tang et al. | 326/39 |
| 2012/0072626 A1 | 3/2012 | Scott et al. | |
| 2012/0072628 A1 | 3/2012 | Crockett et al. | |
| 2013/0297829 A1 * | 11/2013 | Berenbaum et al. | 710/3 |

FOREIGN PATENT DOCUMENTS

EP 2388960 A1 11/2011

OTHER PUBLICATIONS

Maxim Integrated Application Note 3947 "Daisy-Chaining SPI Devices"; Dec. 15, 2006; accessed May 28, 2014 at URL <http://www.maximintegrated.com/en/app-notes/index.mvp/id/3947>.*
Wikipedia article "Serial Peripheral Interface Bus" dated Jul. 26, 2012; accessed May 28, 2014 at URL <http://en.wikipedia.com/w/index.php?title=Serial_Peripheral_Interface_Bus&oldid=504243738>.*
PCT Search Report and Written Opinion issued in connection with corresponding WO Patent Application No. PCT/US2013/051014 dated on Oct. 10, 2013.

* cited by examiner

*Primary Examiner* — Glenn A Auve
(74) *Attorney, Agent, or Firm* — Fletcher Yoder, P.C.

(57) ABSTRACT

System and methods are provided. In one embodiment, a system includes serial peripheral interface (SPI) bus and a master device communicatively coupled to the serial peripheral interface (SPI) bus. The system further includes a first slave device communicatively coupled to the SPI bus. The system additionally includes a second slave device communicatively coupled to the SPI bus and to the first slave device; wherein the first and the second slave devices are communicatively coupled in parallel to the SPI bus and wherein the first and the second slave devices are communicatively coupled to each other by using a first chain line, and wherein the master device is configured to communicate with the first and with the second slave devices over the SPI bus.

20 Claims, 3 Drawing Sheets

SYSTEMS AND METHODS FOR CONCATENATING MULTIPLE DEVICES

BACKGROUND OF THE INVENTION

The subject matter disclosed herein relates to the interfacing of systems, and more specifically, to the concatenation or joining of multiple systems.

Certain systems, such as serial peripheral interface (SPI) systems, may provide for the use of two devices. For example, a slave device may be communicatively coupled to a master device. The master device may delegate certain processing tasks, such as data acquisition tasks, to the slave processors. Acquired data may then be provided to the master device. It would be beneficial to improve the interface between the master and slave devices.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes serial peripheral interface (SPI) bus and a master device communicatively coupled to the serial peripheral interface (SPI) bus. The system further includes a first slave device communicatively coupled to the SPI bus. The system additionally includes a second slave device communicatively coupled to the SPI bus and to the first slave device; wherein the first and the second slave devices are communicatively coupled in parallel to the SPI bus and wherein the first and the second slave devices are communicatively coupled to each other by using a first chain line, and wherein the master device is configured to communicate with the first and with the second slave devices over the SPI bus.

In a second embodiment, a method includes determining if a slave select (SSEL) line included in a SPI bus is active. The method further includes determining if a chain line is active, and if the SSEL line and the chain line are both active then: receiving a command having M bits by using a master output slave input (MOSI) line included in the SPI bus, transmitting a response by using a tristate-enabled master input slave output (MISO) line included in the SPI bus, determining if the SSEL line is still active, and if the SSEL line is still active, then asserting a chain output port active.

In a third embodiment, non-transitory tangible computer-readable medium includes executable code, the executable code includes instructions for determining if a slave select (SSEL) line included in a SPI bus is active. The instructions further include determining if a first chain line is active, and if the SSEL line and the first chain line are both active then: receiving a command having M bits by using a master output slave input (MOSI) line included in the SPI bus, transmitting a response by using a tristate-enabled master input slave output (MISO) line included in the SPI bus, determining if the SSEL line is still active, and if the SSEL line is still active, then asserting a second chain line active.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
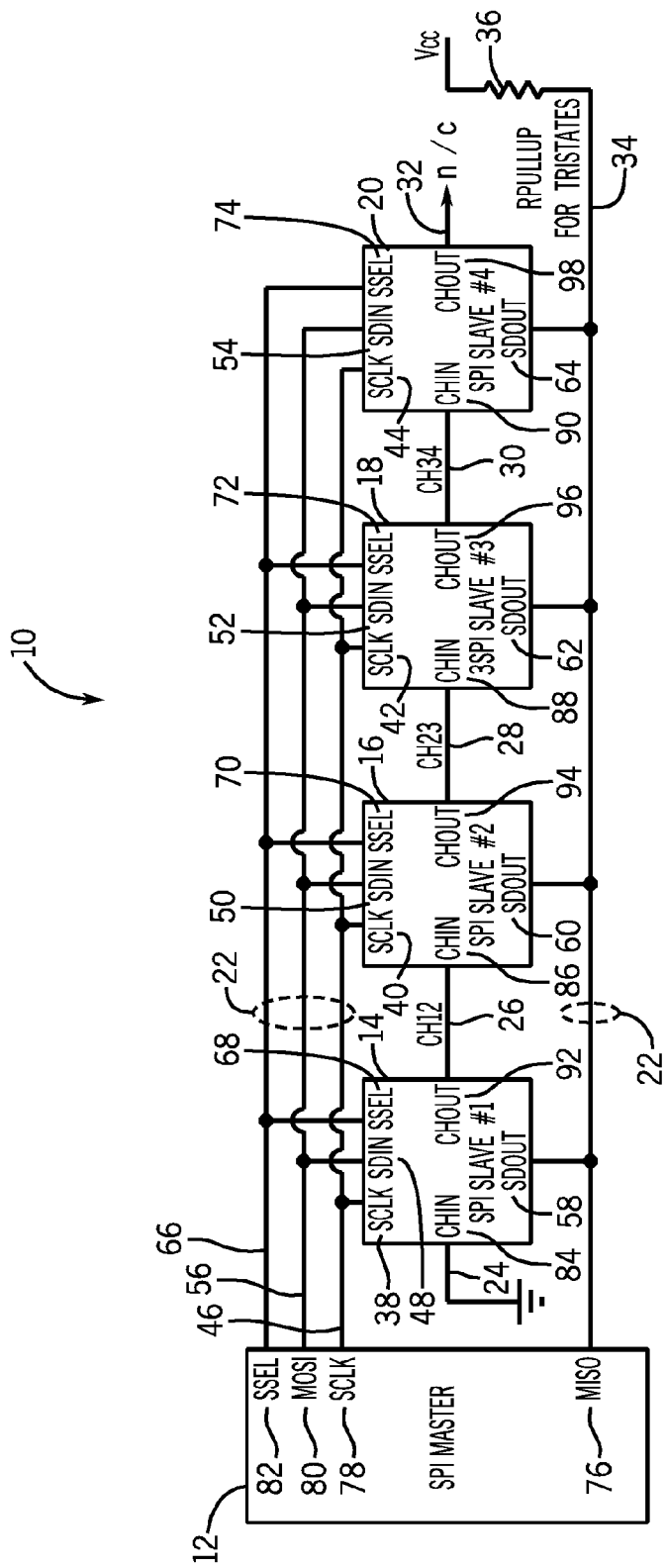
FIG. 1 is a block diagram of an embodiment of a master processor communicatively coupled to a plurality of slave processors.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Certain processor-based systems, such as data acquisition systems, may include multiple devices. For example, a master device or integrated circuit (IC) may be communicatively coupled to one or more slave devices or ICs. The master device may delegate certain tasks to the slave devices, such as data acquisition tasks, and communicate with the slave devices by using, for example, a Serial Peripheral Interface (SPI) bus system. The SPI bus system may include a "four-wire" serial bus including four pins suitable for communicatively coupling the slave devices with a master processor, wherein the slave devices are connected to the SPI bus in parallel with tristate (e.g., wired-OR) outputs.

The systems and methods described herein enable the use of the SPI bus to couple a master device to multiple slave devices by adding a chain input port and a chain output port to each slave device, and allowing a serial output (SDOUT) connected to a master input slave output (MISO) to be tristated, in addition to other SPI ports used to connect to the SPI bus. The slave devices may then be sequentially chained together, connecting each slave device to the next slave device downstream of the chain. To connect nearby devices, a chain line is coupled to the chain output port of the upstream device and to the chain input port of the downstream device. A technique is described herein wherein the master device transmits a plurality of commands through a single master output slave input (MOSI) line. Each command may be issued to a different slave device. To retrieve the command associated with a specific slave device, a chaining technique may be used. In one example, a first of the slave devices may begin communicating with the master device. Once a certain number of M bits are received and/or sent, the first device may then signal a second of the slave devices through a first dedicated chain line (e.g., handover line) communicatively coupling the first slave device to the second slave device. The second slave device may then proceed to communicate with the master device. Once a certain number of M bits (e.g., 4 bits, 8 bits, 16 bits, 32 bits, 64 bits) are received and/or sent, the second device may then signal a third of the slave devices through a second dedicated chain line (e.g., handover line) communicatively coupling the second slave device to the third slave device. Likewise, a fourth, fifth, sixth, seventh, eight or more slave devices may be concatenated (e.g., chained) by using corresponding third, fourth, fifth, sixth, and seventh dedicated chain lines, and thus participate in communications with the master device.

Advantageously, a new slave device may be more easily added to the chain. For example, the new slave device may be added by simply coupling the master device's slave select (SSEL) line, MOSI line, serial clock (SCLK) line, and master input slave output (MISO) line to a corresponding SSEL line, slave device input (SDIN) line, SCLK line, and slave device output (SDOUT) of the new slave device, and by coupling a chain in (CHIN) line of the new slave device to a chain out (CHOUT) line of the last slave device in the chain. In one example, the SDOUT line may be a tristate line, also referred to as a wired-OR line. Further, variable length sequences of commands may be used. For example, a sequence may include 1, 2, 3, 4, 5, 6, . . . N commands. Additionally, each command may include a certain number of bits (e.g., 4, 8, 16, 32, 64, 128 bits or more), denoted as M bits. By enabling a more efficient communicative concatenation of any number of slave devices to the master device, the techniques describe herein may provide for more cost-effective, simplified and flexible master to slave communication systems and methods.

With the foregoing in mind and turning now to FIG. 1, the figure depicts a block diagram of an embodiment of an electronic system 10, including a master device 12, and 4 slave devices, 14, 16, 18, and 20. In one embodiment, each of the devices 12, 14, 16, 18, and 20 may be included in separate ICs, one IC including each of the devices 12, 14, 16, 18, and 20. The IC may include, for example, an application-specific integrated circuit (ASIC), a field-programmable gate array (FPGA), a commercially available processor, or any combination thereof. In another embodiment, all the devices 12, 14, 16, 18, and 20 may be included in the same IC. In yet another embodiment, 2, 3, 4, or more ICs may be used to host the devices 12, 14, 16, 18, and 20. In the depicted embodiment, the devices 12, 14, 16, 18, and 20 are connected to a SPI bus 22. As mentioned above, the SPI protocol is a 4-wire protocol that enables full duplex transmission of data during each clock cycle. The techniques described herein use the SPI bus 22 and add, for example, handover or chain lines 24, 26, 28, 30, and 32, labeled "CH12," "CH23," and "CH34" respectively. Additionally, a tristate (e.g., wired-OR) mode of operations may be added to a master input slave output (MISO) line 34 of the SPI bus 22, thus enabling the transmission of data back to the master device 12 from any one of the slave devices 14, 16, 18, and 20. In the depicted example, a pull-up resistor 36 may be used for logic high (e.g., +5V) of the tristate MISO line 34.

In the depicted embodiment, each of the slave devices 14, 16, 18, and 20 is connected to the SPI bus 22 in parallel. Accordingly, slave clock (SCLK) ports 38, 40, 42, and 44 of the slave devices 14, 16, 18, and 20, respectively, are connected to a slave clock line 46 of the SPI bus 22. In a similar manner, slave data input (SDIN) ports 48, 50, 52, and 54 of the slave devices 14, 16, 18, and 20, respectively, are connected to a master output slave input (MOSI) line 56 of the SPI bus 22. Likewise, slave data output (SDOUT) ports 58, 60, 62 and 64 of the slave devices 14, 16, 18, and 20, respectively, are connected to the MISO line 34.

The techniques described herein may use a slave select (SSEL) line 66 to enable the master device 12 to alert the slave device 14, 16, 18, and 20 that communications are to begin. Accordingly, each slave device 14, 16, 18, and 20 includes SSEL ports 68, 70, 72, and 74 connected to the line 66. In the depicted embodiment, the master device 12 is connected to the lines 34, 46, 56, and 66 respectively, by using a MISO port 76, a SCLK port 78, a MOSI port 80, and a SSEL port 82.

When the master device 12 desires to initiate communications, the master device 12 may set a clock to use a frequency less than or equal to those frequencies supported by the slave devices 14, 16, 18, and 20. The SCLK 46 may generate bursts of clock pulses or run continuously. The master device 12 may then transmit a chip select bit by using the SSEL line 66. All the devices 14, 16, 18, and 20 may thus be notified of the start of communications. During each SPI clock cycle (e.g., provided by using the SCLK line 46), full duplex data transmission may occur. Using the techniques described herein, the master device 12 may transmit a command sequence having multiple commands. The command sequence is transmitted as a stream of bits placed on the MOSI line 56. The command sequence may be received by the slave devices, and the slave devices may take turns in processing commands in the sequence and responding to the commands.

With respect to the data flow, the slave devices 14, 16, 18, and 20 act as a serial sequence of registers for the bit stream. For example, the first slave device 14 in the depicted slave device chain may receive a first series of bits (e.g., first command) from the bit stream, and once the first series of bits is received, then transfer data flow control to the next device, e.g., device 16, down the chain. The device 16 may then receive a second series of bits (e.g., second command) from the bit stream, and then transfer data flow control to the next device on the chain, e.g., slave device 18. Likewise, the device 18 may receive a third series of bits (e.g., third command) from the bit stream, and then transfer data flow to the next device down the chain, e.g., the device 20. Additionally or alternatively, each slave device 14, 16, 18, and 20 may transmit a response during the time that the device 14, 16, and 18 is in control of the data flow, enabling full duplex transmission.

To coordinate among the slave devices 14, 16, and 18, the devices 14, 16, and 18 include chain in (CHIN) ports 84, 86, 88, and 90, respectively, and chain out (CHOUT) ports 92, 94, 96, and 98, respectively. The first SPI slave device 14 in the interface sequence (e.g., chain) has its CHIN port 84 tied low (e.g., active low logic), with successive slave devices 16, 18, and 20 in the sequence having their CHIN ports 86, 88, and 90 connected to the prior slave devices 14, 16, and 18 CHOUT ports 92, 94, and 96. The final slave device in the interface sequence has the CHOUT port 98 not connected. To add a new device to the chain, the new device is simply connected in parallel to the SPI bus 22, and the new device's CHIN port is then connected to the CHOUT port 98, while the new device's CHOUT port is left unconnected. Indeed, a simple parallel connection to the SPI bus and a connection the last CHOUT (e.g., port 98) in the chain would provide for the addition of a new slave device. In this manner, any number of slave devices may be concatenated and communicatively coupled to the master device 12.

The SPI slave devices 14, 16, 18, and 20 may pass a signal down the chain, where each device 14, 16, 18, and 20 having data flow control keeps its CHOUT port 92, 94, 96, and 98 inactive (e.g., set high) until a certain number of M bits making up a command have been shifted into the device having the data flow control. The M bits of the command may be variable, changing based on the detected type of message shifted in. For example, in one command sequence, M may be 16 bits, but in a second command sequence, M may be 32 bits. Further, each device 14, 16, 18, and 20 may have its own desired length of message, as shown further below with respect to FIG. 2. When the slave device (e.g., device 14, 16, 18, and 20) sees both its CHIN and SSEL ports active, the slave device's output SDOUT may be allowed to go active to respond to the command, otherwise the output remains in tristate. Further, the duration of the tristate being driven may be based on the maximum length of the response. Once all the response and command bits have been transferred, the slave device (e.g., device 14, 16, 18, and 20) having data flow control may then assert its CHOUT port, effectively transferring the hardware bus 22 (e.g., data flow control) to the next slave down the chain. If SSEL 66 goes inactive, all slaves 14, 16, 18, and 20 may revert back to waiting for their SSEL ports 68, 70, 72, and 74 to go active. In other embodiments, the chaining may also accomplished by counting clocks, prior knowledge of the length of each command, and/or by using addressing within the command sent by the master device 12. The addressing technique may be used such that the first address in the bit stream may cause the first slave device 14 to respond, followed by the other slave devices 16, 18, and 20, as they parse and discard commands until an address matches one of the devices. Using the aforementioned techniques, the slave devices 14, 16, 18, and 20 may act equivalent to a virtual serial register of variable length in full duplex communications with the master device 14.

In one embodiment the new slave device may be provided as a component of a kit, and the kit may further include a new chain line (or instructions to make a new chain line). The kit may also include instructions on how to add the new slave device to the chain, for example, by connecting the new slave device to the SPI bus in parallel and by connecting the new chain line to a chain out port included in the new slave device and to a chain in port included in the last slave device in the chain. The master device would not have to be reprogrammed or reflashed after the installation of the new device. Indeed, none of the existing slave devices may have to be reprogrammed or reflashed to accept the new slave device.

The kit may include a module having the new slave device and/or the new chain line, and the module may be used within racks of modules, where the new module may be inserted into the rack with a switch used to either bypass an empty position jumpering across CHIN to CHOUT port or by routing CHIN and CHOUT to the newly added module. While SPI techniques may use similar interconnections, such a tying inputs to outputs on the slaves, such a serial path meant that if any slave failed to respond then all traffic would be interrupted at the faulty slave. The techniques described herein, by using CHIN and CHOUT signals, may control the tristate directly, thus minimizing the undesired loss of data traffic due to logic faults by minimizing the amount of logic and/or computer instructions involved. Further, by using the techniques described herein, if a slave device fails to respond, this unresponsiveness will not disturb the traffic from the other slave devices operating in parallel on their respective SDOUT signals.

Figure 2:
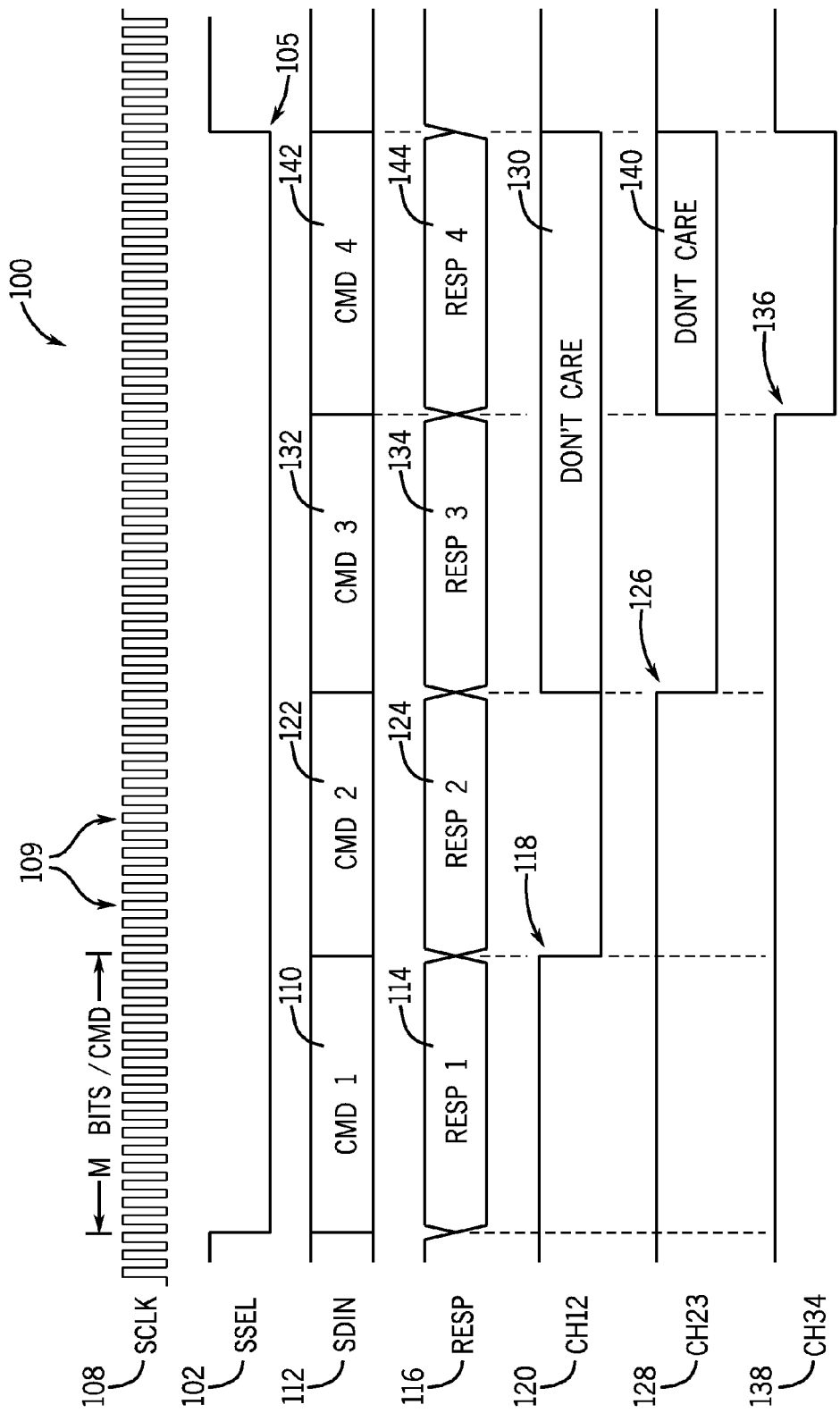
FIG. 2 is a timing diagram of communications between the master device and the slave devices of FIG. 1.

FIG. 2 depicts an embodiment of a timing diagram 100 illustrating a timing of signals between the master device 12 and the slave devices 14, 16, 18, and 20 shown in FIG. 1. As mentioned above, setting the SSEL line 66, such as by using an active low signal 102, may be used as a signal that the master device 14 is ready for communications. In the depicted embodiment, the SSEL signal 102 using active low is depicted as going low at time 104 and lasting approximately 4×16 clock pulses, or 64 clock pulses total, before returning high at time 106. Accordingly, in the depicted example, the communication between the master device 12 and the slave devices 14, 16, 18, and 20 may last 64 clock pulses. It is to be noted that the communication time may be any number of pulses, and is not limited to 64 clock pulses. A SCLK pulse timeline 108 is also shown, depicting multiple clock pulses 109 that may be issued by the master device 12, sent through the SCLK line 46, and received by all of the slave devices 14, 16, 18, and 20.

In one embodiment, because the SSEL line 66 is set active low and because the CHIN port 84 is also set active low, the first slave device 14 in the chain is nominated as controlling the slave side of the data flow. Accordingly, a command, such as the command 110 (e.g., labeled "Cmd 1") sent by the master device 12 through the MOSI line 80, is processed by the first slave device 14, as shown by the SDIN timeline 112. In the depicted example, the command 110 includes a length M of 16 bits. However, the command 110 may include any length less than or greater than 16 bits. Indeed, the command 110 may include variable lengths where M is set to any integer number from 1 to as large as needed, for example, to cover the largest combination of commands for any desired application.

Because both the SSEL line 66 and the CHIN port 84 are set active low, the first slave device 14 may send a response 114 (labeled "Resp 1") through the MISO line 34, as shown by the response timeline 116. In this manner, the master device 12 may communicate with the slave device 14 in full duplex. Once the M-bits of the command 110 are received, the first slave device 14 may pass on data flow control to the second slave device 16. To do so, the slave device 14 may set the chain line 26 (e.g., CH12) into active low at time 118, as shown in the timeline 120. Accordingly, the second command 122 issued by the master device 12 may be processed by the second slave device 16. The second device 16 may then also issue a response 124 by sending data through the MISO line 34. In this manner, a chaining transition between the first slave device 14 and the second device 16 may be more easily provided.

Once the second slave device 16 processes M bits from the second command 122, the second slave device 16 may set the chain line 28 (e.g., CH23) into active low at time 126 shown in timeline 128. Accordingly, the data flow control may pass onto the third slave device 18, and the chain line 26 may enter into a "don't care" mode 130, so that the chain line 26 conditions do not enter into the data flow process.

A third command 132 issued by the master device 12 may then be processed by the third slave device 18. Likewise a third response 134 may be issued by the slave device 18 and placed onto the MISO line 34, thus enabling full duplex communications between the master device 12 and the slave device 18. At the end of processing the M bits from the third command 132, the third slave device 18 may set the chain line 30 (e.g., CH34) into active low at time 136, as shown by timeline 138. Accordingly, the data flow control may now pass onto the fourth slave device 20 in the chain, and the data line 28 may also enter into a "don't care" mode 140 so the chain line 26 conditions do not enter into the data flow process.

A fourth command 142 issued by the master device 12 may then be processed by the fourth slave device 20. Likewise a fourth response 144 may be issued by the slave device 20 and placed onto the MISO line 34, thus enabling full duplex communications between the master device 12 and the slave device 20. The master device 12 may then set the SSEL line 66 to high at time 106, thus ending the communications. It is to be understood that, while the timing diagram 100 depicts the transmission of four commands 110, 122, 132 and 142, the systems and methods disclosed herein may provide for any number of commands. Indeed, a command sequence may be constructed as having 1, 2, 3, 4, 5, 6, 7, 8, 9, 10 or more commands. Likewise, a response sequence may be built having 1, 2, 3, 4, 5, 6, 7, 8, 9, 10 or more responses.

Figure 3:
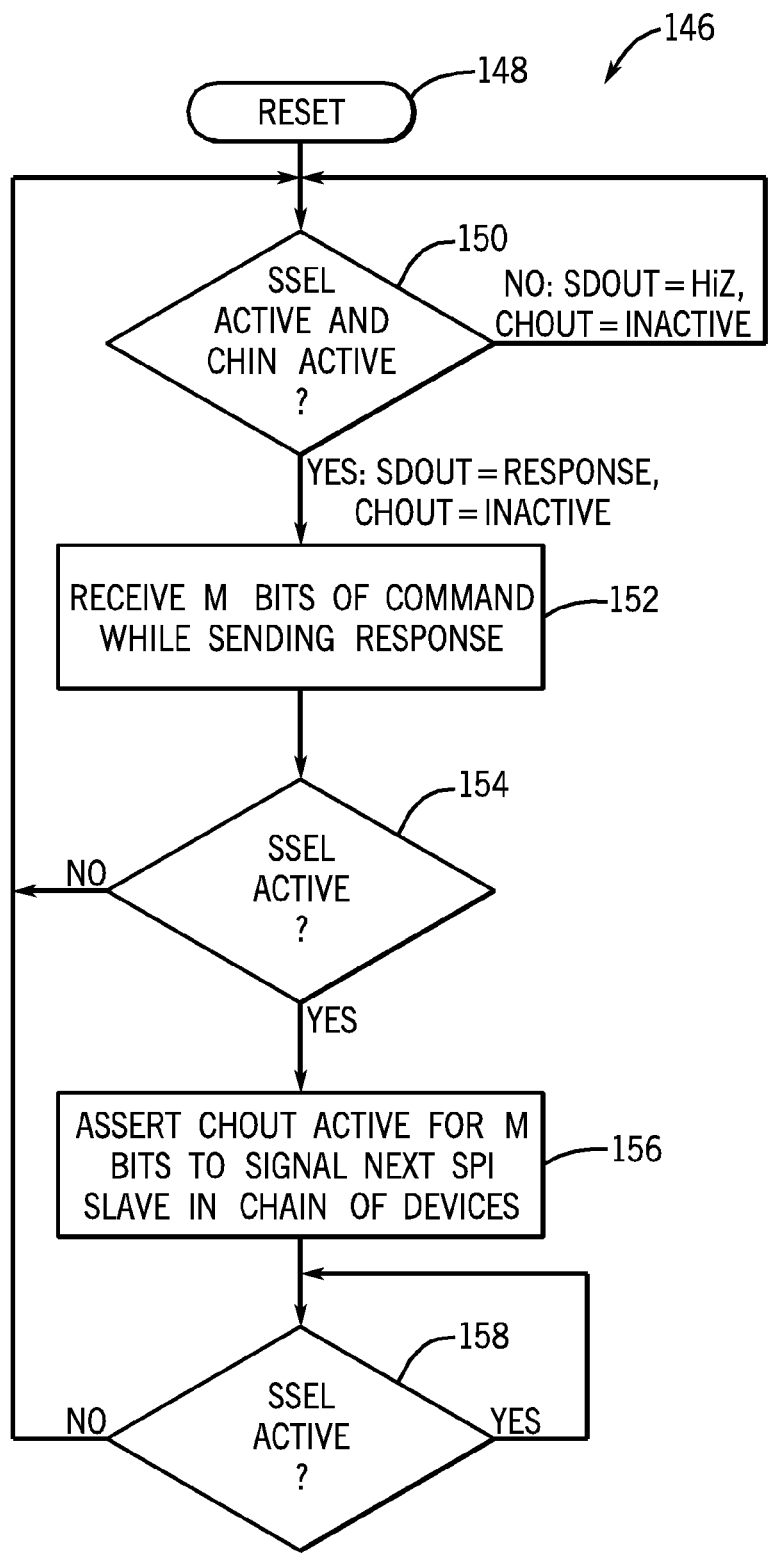
FIG. 3 is a flowchart of an embodiment of a process for communications between the master device and the slave devices of FIG. 1.

FIG. 3 is a flow chart depicting an embodiment of a process 146 that may be used to send and receive data between the master device 12 and the slave devices 14, 16, 18, and 20 shown in FIG. 1. The process 146 may be implemented as executable computer instructions or code stored in a non-transitory medium of a memory included in the master device 12 and the slave devices 14, 16, 18, and 20. The process 146 may begin with a reset command (block 148), operationally resetting the master device 12 and the slave devices 14, 16, 18, and 20 in preparation for communication operations. The process 146 may then determine (decision 150) if the SSEL line 66 and the CHIN ports 84, 86, 88, and 90 are active. As mentioned above, the SSEL line 66 may be placed into active low by the master processor 12 when communications are desired. Likewise, the CHIN ports 86, 88, and 90 may be placed active by the slave devices 14, 16, and 18, while the CHIN port 84 of the first slave device 14 may be in active low because of a coupling to ground.

It is to be noted that each slave device 14, 16, 18, and 20 may individually make the determination (decision 150) that SSEL line 66 is active and that its CHIN port (e.g., ports 84, 86, 88, and 90) is active. If it is determined (decision 150) that the SSEL line 66 is not active or that the CHIN port (e.g., ports 84, 86, 88, and 90) is not active, then the process 146 may set the SDOUT ports to high (e.g., logic 0) and set the CHOUT ports 92, 94, 96 and 98 as inactive and the process 146 may then again make the determination 150. If any of the slave devices 14, 16, 18, and 20 determine (decision 150) that the SSEL line 66 is active and that their CHIN port (e.g., ports 84, 86, 88, and 90) is also active, then the process 146 (e.g., executed by the slave device 14, 16, 18, or 20 having data flow control) may initiate a response by using the MISO line 34 and set the appropriate CHOUT port to inactive. That is, the slave device 14, 16, 18, or 20 that makes the determination 146 may then respond and set its CHOUT port inactive.

The process 146 may also then receive the M bits of a command while sending out the response (block 152). After receiving the M bits, the process 146 may then determine (decision 154) if the SSEL line 66 is still active. If the SSEL line 66 is not active, then the process 150 may go back to decision 150. If the SSEL line 66 is active, then the process 146 may assert (block 156) the CHOUT port (e.g., port 92, 94, 96, or 98) active for a timing of M bit pulses in order to pass the data flow control to the next slave device in the chain. The process 146 (e.g., executed by the slave device 14, 16, 18, or 20 previously having data flow control) may then determine (decision 158) if the SSEL line 66 is still active. If the SSEL line 66 is still active, then the slave device 14, 16, 18, or 20 previously having data flow control may continue determining (decision 158) if the SSEL line 66 is active, thus enabling the slave device 14, 16, 18, or 20 having the data flow control from communicating with the master device 12. If the SSEL line 66 is not active (decision 158), then the process 146 may go to decision 150. By using the SSEL line 66 and by passing data flow control through chain lines 26, 28, and 30, the systems and methods disclosed herein may enable full duplex communications of any number of variable length commands between the master device 12 and the slave devices 14, 16, 18, and 20.

Technical effects of the invention include enabling communications between a master device and one or more slave devices by using a variable sequence of commands, each command having a variable number of M bits. In one embodiment, a single "four wire" SPI bus is used to communicatively couple the master device to all of the slave devices. Each of the slave devices is connected in parallel to the single SPI bus, and chain input/output lines communicatively couple the slave devices into a chain. A sequence of bits may be sent by the master device, and the slave devices may act as a single virtual register suitable for full duplex communication, receiving the sequence of bits and responding with data. A new device may be more easily added to the chain by coupling the device in parallel to the SPI bus and by adding a new chain line between the new device and the previously last device of the chain.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a serial peripheral interface (SPI) bus;
a master device communicatively coupled to the serial peripheral interface (SPI) bus;
a first slave device communicatively coupled to the SPI bus; and
a second slave device communicatively coupled to the SPI bus and to the first slave device, wherein the first and the second slave devices are communicatively coupled in parallel to the SPI bus, the first and the second slave devices are communicatively coupled to each other by using a first chain line, and the master device is configured to communicate with the first and the second slave devices over the SPI bus, wherein the first slave device comprises a first chain input port and a first chain output port, the second slave device comprises a second chain input port and a second chain output port, the first chain input port is connected to a ground, the first chain output port is connected to the second chain input port through the first chain line, and the second chain output port is left unconnected.

2. The system of claim 1, wherein the SPI bus comprises a master input slave output (MISO) line, and the MISO line is configure to include a wired-OR configured to enable the first and the second slave devices to respond to the master device.

3. The system of claim 2, wherein the master device is configured to transmit a first and a second command, the first slave device is configured to transmit a first response to the first command by using the MISO line, and the second slave device is configured to transmit a second response to the second command by using the MISO line.

4. The system of claim 3, wherein the first command comprises 4 bits, 8 bits, 16 bits, 32 bits, or 64 bits.

5. The system of claim 4, wherein the master device is configured to select any one of the 4 bits, 8 bits, 16 bits, 32 bits, or 64 bits as a first command length in a first command sequence, and any one of the 4 bits, 8 bits, 16 bits, 32 bits, or 64 bits as the first command length in a second command sequence following the first command sequence.

6. The system of claim 3, wherein the first slave device is configured to transfer data flow control to the second slave device by using the first chain line.

7. The system of claim 6, wherein the SPI bus comprises a slave select line (SSEL), the transfer of data flow control comprises determining that the SSEL line is active and that a chain input port of the first slave device is active, and if the SSEL line is active and the chain input port of the first slave device is active, setting the first chain line active.

8. The system of claim 1, comprising a third slave device communicatively coupled to the SPI bus and to the second slave device, wherein the first, the second, and the third slave devices are communicatively coupled in parallel to the SPI bus, the second and the third slave devices are communicatively coupled to each other by using a second chain line, and the master device is configured to communicate with the first, the second, and the third slave devices over the SPI bus.

9. The system of claim 8, wherein the third slave device and the second chain line are provided as part of a kit, and wherein the kit comprises instructions to add the third device by connecting the third device to the SPI bus in parallel and by connecting the second chain line to a chain out port included in the second device and to a chain in port included in the third device, and wherein the master device is not reprogrammed.

10. A method comprising:
determining if a slave select (SSEL) line included in a SPI bus is active;
determining if a chain line is active;
if the SSEL line and the chain line are both active then:
receiving a command having M bits by using a master output slave input (MOSI) line included in the SPI bus;
transmitting a response by using a tristate-enabled master input slave output (MISO) line included in the SPI bus;
determining if the SSEL line is still active; and
if the SSEL line is still active, then asserting a chain output port active.

11. The method of claim 10, comprising determining if the SSEL line included in the SPI bus is active via a first slave device of an integrated circuit (IC) system.

12. The method of claim 10, wherein the command comprises a first length of 4 bits, 8 bits, 16 bits, 32 bits, or 64 bits when the command is included in a first command sequence, and a second length of 4 bits, 8 bits, 16 bits, 32 bits, or 64 bits when the command is included in a second command sequence.

13. The method of claim 12, wherein a master device transmits the first and the second command sequences, and the first length is not equal to the second length.

14. A non-transitory tangible computer-readable medium comprising executable code, the executable code comprising instructions for:
determining if a slave select (SSEL) line included in a SPI bus is active;
determining if a first chain line is active;
if the SSEL line and the first chain line are both active then:
receiving a command having M bits by using a master output slave input (MOSI) line included in the SPI bus;
transmitting a response by using a tristate-enabled master input slave output (MISO) line included in the SPI bus;
determining if the SSEL line is still active; and
if the SSEL line is still active, then asserting a second chain line active.

15. The non-transitory tangible computer-readable medium of claim 14, wherein the instructions for determining if the SSEL line included in the SPI bus is active comprise instructions executable by a first slave device.

16. The non-transitory tangible computer-readable medium of claim 15, comprising instructions for passing data flow control from the first slave device to a second slave device by asserting the second chain line active.

17. The non-transitory tangible computer-readable medium of claim 14, wherein the command comprises a first length of 4 bits, 8 bits, 16 bits, 32 bits, or 64 bits when the command is included in a first command sequence, and a second length of 4 bits, 8 bits, 16 bits, 32 bits, or 64 bits when the command is included in a second command sequence.

18. The non-transitory tangible computer-readable medium of claim 17, wherein a master device transmits the first and the second command sequences and wherein the first length is not equal to the second length.

19. The non-transitory tangible computer-readable medium of claim 14, wherein receiving the command and transmitting the response occurs in full duplex.

20. A system comprising:
a serial peripheral interface (SPI) bus;
a master device communicatively coupled to the serial peripheral interface (SPI) bus;
a first slave device communicatively coupled to the SPI bus;
a second slave device communicatively coupled to the SPI bus and to the first slave device; and
a third slave device communicatively coupled to the SPI bus and to the second slave device; wherein the first, the second, and the third slave devices are communicatively coupled in parallel to the SPI bus, the first and the second slave devices are communicatively coupled to each other by using a first chain line, the second and the third slave devices are communicatively coupled to each other by using a second chain line, and the master device is configured to communicate with the first, the second, and the third slave devices over the SPI bus, and wherein the third slave device and the second chain line are provided as part of a kit, and wherein the kit comprises instructions to add the third device by connecting the third device to the SPI bus in parallel and by connecting the second chain line to a chain out port included in the second device and to a chain in port included in the third device, and wherein the master device is not reprogrammed.

* * * * *